United States Patent
Notcutt et al.

(10) Patent No.: US 10,141,712 B1
(45) Date of Patent: Nov. 27, 2018

(54) METHOD FOR ADJUSTING CAVITY LENGTH OF AN OPTICAL CAVITY

(71) Applicant: Stable Laser Systems, Inc., Boulder, CO (US)

(72) Inventors: Mark Notcutt, Boulder, CO (US); Kevin Knabe, Morrison, CO (US)

(73) Assignee: Stable Laser Systems, Inc., Boulder, CO (US)

( * ) Notice: Subject to any disclaimer, the term of this patent is extended or adjusted under 35 U.S.C. 154(b) by 0 days.

(21) Appl. No.: 15/824,563

(22) Filed: Nov. 28, 2017

Related U.S. Application Data (60) Provisional application No. 62/428,444, filed on Nov. 30, 2016.

(51) Int. Cl.
| | |
|---|---|
| *H01S 3/139* | (2006.01) |
| *H01S 3/105* | (2006.01) |
| *G01B 11/02* | (2006.01) |
| *H01S 3/137* | (2006.01) |

(52) U.S. Cl.
CPC .............. *H01S 3/105* (2013.01); *G01B 11/02* (2013.01); *H01S 3/137* (2013.01); *H01S 3/139* (2013.01)

(58) Field of Classification Search
CPC .................................. H01S 3/105; H01S 3/139
See application file for complete search history.

(56) References Cited

U.S. PATENT DOCUMENTS

| | | | |
|---|---|---|---|
| 6,379,984 B1 | 4/2002 | Sandberg et al. | |
| 6,654,392 B1 * | 11/2003 | Arbore | H01S 3/025 372/20 |
| 7,002,697 B2 | 2/2006 | Domash et al. | |
| 7,146,064 B2 | 12/2006 | Wimperis et al. | |
| 2004/0111856 A1 | 6/2004 | Chang et al. | |
| 2011/0299166 A1 | 12/2011 | Sun | |

OTHER PUBLICATIONS

Boucher, et al. (1992) "Calibrated Fabry-Perot etalon as an absolute frequency reference for OFDM communications." IEEE Photonics Technol. Lett., vol. 4, issue 7, pp. 801-804.

* cited by examiner

*Primary Examiner* — Michael Carter
(74) *Attorney, Agent, or Firm* — Leydig, Voit & Mayer, Ltd.

(57) ABSTRACT

A method for adjusting an optical cavity's length includes: measuring a first absolute frequency corresponding to a cavity mode, the optical cavity having a first and second mirror having respective first and second mirror surfaces separated by a first cavity length, and a resonator body interposed therebetween; determining a length difference between the first cavity length and a target cavity length corresponding to a plurality of resonance frequencies that includes a target absolute optical frequency; removing the first mirror to expose a first end of the resonator body; depositing, on one of the first end and the first mirror, a spacer having a thickness within a length tolerance of the determined length difference; and reversibly securing the first mirror to the resonator body, the spacer being between the first mirror and the resonator body, the first and second mirrors being separated, within the length tolerance, by an adjusted cavity length.

22 Claims, 3 Drawing Sheets

METHOD FOR ADJUSTING CAVITY LENGTH OF AN OPTICAL CAVITY

CROSS-REFERENCE TO RELATED APPLICATIONS

This application claims the benefit of priority of U.S. Provisional Application Ser. No. 62/428,444 filed Nov. 30, 2016, which is hereby incorporated by reference in its entirety, to the extent not inconsistent herewith.

STATEMENT REGARDING FEDERALLY SPONSORED RESEARCH OR DEVELOPMENT

This invention was made with government support under contract number FA9453-15-C-0436 awarded by the United States Air Force. The government has certain rights in the invention.

BACKGROUND

Many advances in atomic, molecular, and atomic physics, and technologies derived therefrom (e.g., atomic clocks, GPS), depend on use of frequency-stabilized lasers. A common method for frequency-stabilizing a laser involves referencing the laser to a Fabry-Perot optical cavity having a free-spectral range (FSR) defined by the cavity's axial length. The cavity's FSR determines a comb of optical frequencies, resonance frequencies, to which the laser can be stabilized. Precise frequency stabilization, and its practical implementation, may require one of the resonance frequencies to be within an absolute frequency band. Hence, precise adjustment of the cavity's axial length ("tuning the cavity") is critical for effective frequency stabilization. Methods for tuning an optical cavity include "baking" of cavity mirrors and lateral translation of a curved cavity mirror with respect to the cavity axis. Drawbacks of such methods include slow implementation and limiting tuning range.

SUMMARY

Applicant has discovered a method for tuning an optical cavity that is faster than previous methods.

In an aspect, the invention provides a method for adjusting a cavity length of an optical cavity, comprising: (i) measuring a first absolute frequency corresponding to a cavity mode of the optical cavity, the optical cavity having (a) a first mirror having a first mirror surface, (b) a second mirror having a second mirror surface, and (c) a resonator body interposed between the first and second mirror surfaces, the first and second mirror surfaces being separated by a first cavity length; (ii) determining a length difference between a target cavity length and the first cavity length, the target cavity length corresponding to a plurality of resonance frequencies that includes a target absolute optical frequency, the length difference being a function of the first absolute frequency, the target absolute frequency, the first cavity length, and a predetermined free-space wavelength; (iii) removing the first mirror to expose a first end of the resonator body; (iv) depositing, on one of the first end and the first mirror, a spacer having a thickness within a length tolerance of the determined length difference; and (v) securing the first mirror to the resonator body, such that (a) the spacer is between the first mirror and the resonator body, and (b) opposing surfaces of the first and second mirrors are separated by an adjusted cavity length that is within the length tolerance of the target cavity length.

In an embodiment, for example, the step of measuring the first absolute frequency comprises measuring the first absolute frequency within an accuracy of one hundred Hertz. In an embodiment, for example, the step of depositing a spacer includes depositing the spacer on the first mirror. In an embodiment, for example, the step of securing the first mirror to the resonator body includes reversibly securing the first mirror to the resonator body In an embodiment, for example, the predetermined free-space wavelength corresponds to the target absolute optical frequency. In an embodiment, for example, the target mode has a target mode number q', the first absolute frequency corresponding to a first mode number q of the optical cavity and being denoted by $$v_q = q\frac{c}{2L}$$

where c is the speed or right in vacuum and L is the first cavity length, target mode number q' being equal to first mode number q. In an embodiment, for example, the target mode number q' corresponds to a mode frequency $$v_{q'} = q'\frac{c}{2L'},$$

where L' denotes the target cavity length, the determined length difference being $$(L - L') = \frac{(v_{q'} - v_q)}{v_{q'}}L.$$

In an embodiment, for example, the target mode number q' and first mode number q are unequal. In an embodiment, for example, the target absolute optical frequency corresponds to an atomic or molecular transition. In an embodiment, for example, the target absolute optical frequency corresponds to an atomic transition of one of rubidium, strontium, calcium, krypton, and argon. In an embodiment, for example, the target absolute optical frequency corresponds to a frequency of the ITU grid.

In an embodiment, for example, during the step of measuring, the optical cavity has a pressure less than ten millitorr, and further comprises, before removing the first mirror, increasing the pressure to at least ambient pressure. In an embodiment, for example, the step of measuring the first cavity length comprises obtaining an interferometric measurement thereof. In an embodiment, for example, the length tolerance is at most ten nanometers. In an embodiment, for example, the length tolerance corresponds to a difference $\Delta v(\lambda)$, between the target absolute optical frequency and the first optical frequency, that is less than one percent of a free-spectral range of the optical cavity when the free-space wavelength $\lambda$ equals $\lambda_0 = 1.550$ μm and $\Delta v(\lambda) \propto |\lambda - \lambda_0|^{-1}$.

In an embodiment, for example, the spacer has a thickness variation less than twenty percent of the thickness. In an embodiment, for example, the spacer is formed of fused silica. In an embodiment, for example, the spacer has an annular shape. In an embodiment, for example, the step of depositing comprises ion-beam sputtering the spacer on one of the first end or the first mirror.

In an embodiment, for example, the step of securing comprises securing via chemically activated direct bonding. In an embodiment, for example, the step of securing further comprises directly bonding the first mirror to the resonator body. In an embodiment, for example, the step of directly bonding comprises bonding the first mirror to the resonator body via an optical contact bond.

In an embodiment, for example, the resonator body has, at temperatures between 5° C. and 55° C., a thermal coefficient of expansion less than fifty parts-per-billion per degree centigrade. In an embodiment, for example, the resonator body is formed of at least one of Corning 7972 glass, Corning 7973 glass, and Asahi AZ glass.

In an embodiment, for example, a method for adjusting a cavity length of an optical cavity comprises the steps of: (1) measuring a first absolute frequency corresponding to a cavity mode of the optical cavity, the optical cavity having (i) a first mirror having a first mirror surface, (ii) a second mirror having a second mirror surface, and (iii) a resonator body interposed between the first and second mirror surfaces, the first and second mirror surfaces being separated by a first cavity length; (2) determining a length difference between a target cavity length and the first cavity length, the target cavity length corresponding to a plurality of resonance frequencies that includes a target absolute optical frequency, the length difference being a function of the first absolute frequency, the target absolute frequency, the first cavity length, and a predetermined free-space wavelength; (3) removing the first mirror to expose a first end of the resonator body; (4) depositing, on one of the first end and the first mirror, a spacer having a thickness within a length tolerance of the determined length difference; and (5) reversibly securing the first mirror to the resonator body, such that (a) the spacer is between the first mirror and the resonator body, and (b) opposing surfaces of the first and second mirrors are separated by an adjusted cavity length that is within the length tolerance of the target cavity lengthx

DETAILED DESCRIPTION OF THE EMBODIMENTS

Figure 1:
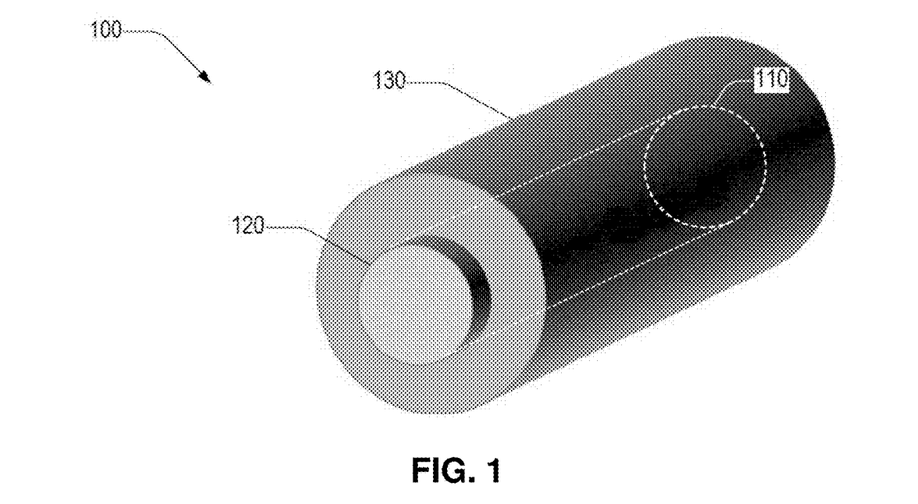
FIG. 1 is a perspective view of an optical cavity.
Figure 2:
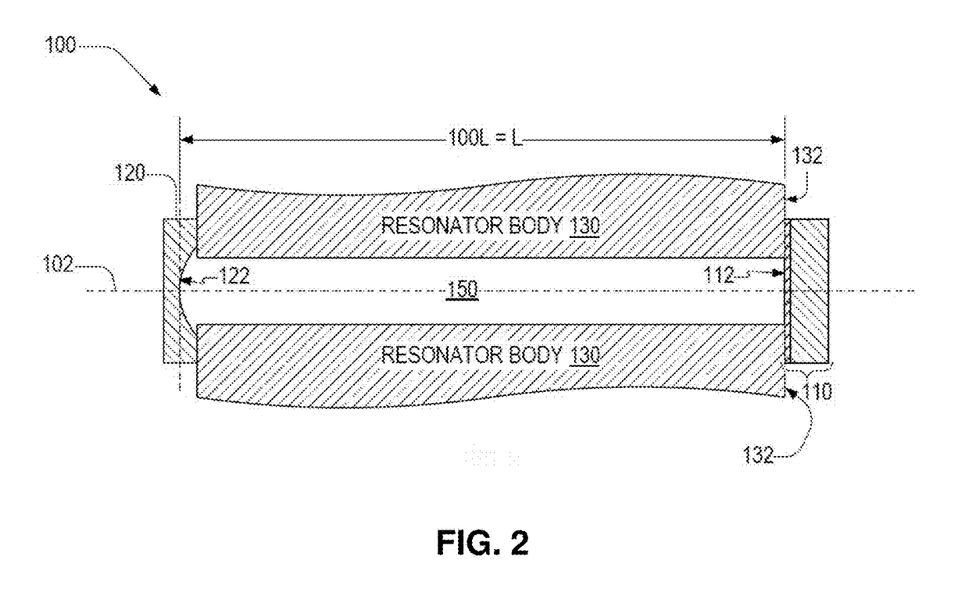
FIG. 2 is a cross-sectional view of the optical cavity of FIG. 1.

FIGS. 1 and 2 are a perspective view and a cross-sectional view, respectively, of an optical cavity 100, and are best viewed together in the following description. Optical cavity 100 includes a first mirror 110, a second mirror 120, and a resonator body 130 therebetween. Resonator body 130 has an end surface 132. First and second mirrors 110 and 120 have respective reflective surfaces 112 and 122 separated by a cavity length 100L, hereinafter also referred to as L, along a cavity axis 102. Each of reflective surfaces 112 and 122 may be either planar or non-planar. The cross-sectional view of FIG. 2 is in a plane that includes cavity axis 102. Optical cavity 100 may be rotationally symmetric about cavity axis 102. Cavity length 100L is ten centimeters, for example. Surface 112 of mirror 110 adjoins end surface 132 of resonator body 130. Surfaces 112 and 132 may be directly bonded, via optical contact bonding and/or chemically activated direct bonding for example, such that no unwanted intermediate material is introduced between surfaces 112 and 132, or that the extend of any unwanted intermediate material between surfaces 112 and 132 is minimized.

Resonator body 130 may be formed of a glass having a low coefficient of thermal expansion. Examples include ULE® glasses by Corning, Inc., such as Corning 7972 glass, Corning 7973 glass, a high-temperature ULE® glass, and Asahi AZ glass. Resonator body 130 may have a thermal coefficient of expansion of less than fifty parts-per-billion-per-degree-Celsius (ppb/° C.) at temperatures between 5° C. and 55° C.

Optical cavity 100 encloses a medium 150 that has a refractive index $n_1$. Medium 150 is, for example, air or vacuum, and may be a solid transparent material without departing from the scope hereof. Medium 150 may be at a pressure less than ten millitorr, which is hereinafter referred to as vacuum pressure. Optical cavity 100 has a resonance frequency $$v_q = q\frac{c}{2L} + f_0,$$

herein after Equation 1, where c is the speed of light in vacuum and $f_0$ is an offset frequency. Integer q denotes a first mode number. Quantity $$\frac{c}{2L}$$

is the free-spectral range of cavity 100, $FSR_{100}$.

Figure 3:
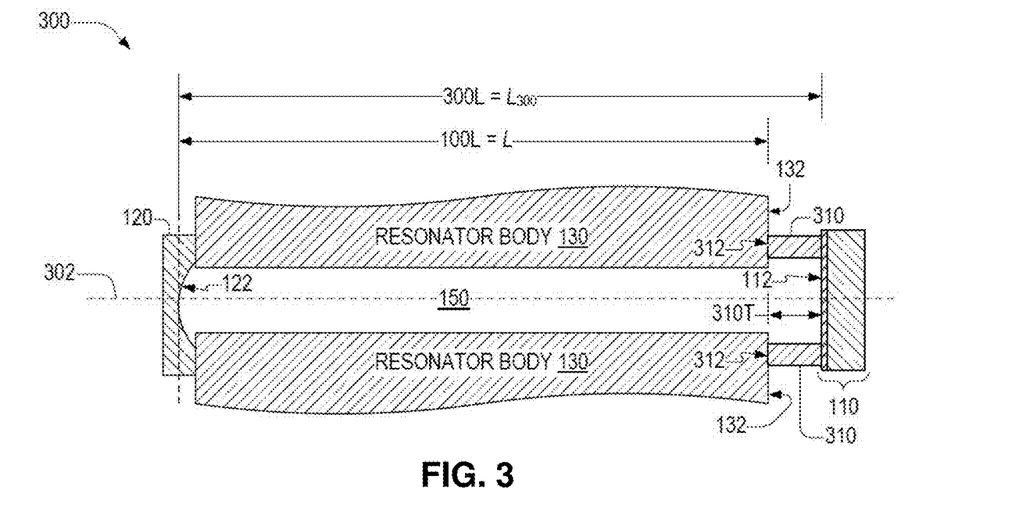
FIG. 3 is a cross-sectional view of an optical cavity that includes an annular spacer, in an embodiment.
Figure 4:
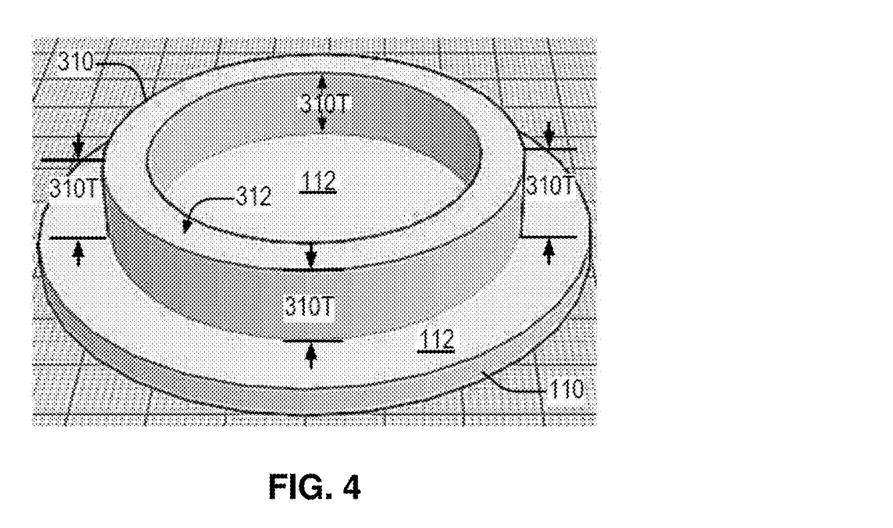
FIG. 4 is a perspective view of the annular spacer of the optical cavity of FIG. 3, in an embodiment.

FIG. 3 is a cross-sectional view of an optical cavity 300, which is optical cavity 100 with the addition of an annular spacer 310 between first mirror 110 and resonator body 130. Optical cavity 300 encloses medium 150. FIG. 4 is a perspective view of annular spacer 310 on first mirror 110 of optical cavity 300. Candidate materials for annular spacer 310 include fused silica, amorphous silicon, titania, tantalum pentoxide, hafnium oxide, and materials compatible with an ion-beam deposition process. While annular spacer 310 has a circular cross-sectional shape in a plane orthogonal to axis 102, its cross-sectional shape may be non-circular, (e.g., one or more of polygonal, elliptical, convex, and concave) without departing from the scope hereof. Spacer 310 may be non-annular without departing from the scope hereof.

Annular spacer 310 has a mean thickness 310T, herein also referred to as $T_{310}$. Mean thickness 310T varies has a root-mean-square thickness variation $\delta_{rms}$. For example, thickness variation $\delta_{rms}$ is less than twenty percent of mean thickness 310T. Mean thickness 310T may be between 0.75 µm and 1.0 µm, for example, when cavity length L=1.0±0.1 meters. Mean thickness 310T may be outside of the aforementioned range without departing from the scope hereof.

Annular spacer 310 has a top surface 312. Surfaces 312 and 132 may be connected via a direct bonding process such as an optical contact bond. For example, surfaces 312 and 132 may each have an optical polish sufficient for optical contact. For example, surfaces 312 and 132 may each have a root-mean-square surface roughness of less than one nanometer and a surface figure of λ/8 at λ=1.55 µm.

In optical cavity 300, first and second mirrors 110 and 120 are separated by an adjusted cavity length 300L, hereinafter also referred to as $L_{300}$, along a cavity axis 302. Cavity 300 has a free-spectral range $$FSR_{300} = \frac{c}{2L_{300}}.$$

Adjusted cavity length $L_{300}=L+T_{310}$. Thickness 310T differs from a predetermined length difference $\Delta$ by a length tolerance $\delta=T_{310}-\Delta$. Accordingly, adjusted cavity length 300L also differs from a target cavity length L' by length tolerance $\delta$. Length tolerance $\delta$ is less than ten nanometers (within a ±5 nm range) or one nanometer (within a ±0.5 nm range), for example. Length tolerance $\delta$ may correspond to a difference $\Delta v(\lambda)$, between the target absolute optical frequency and the first optical frequency. Difference $\Delta v(\lambda)$ is, for example, less than one percent of a free-spectral range of the optical cavity when the free-space wavelength $\lambda$ equals $\lambda_0=1.550$ μm and $\Delta v(\lambda) \propto |\lambda-\lambda_0|^{-1}$. In an embodiment, length tolerance $\delta \leq 1$ nm (within a ±0.5 nm range) and $\Delta v(\lambda) \leq 0.1\%$ of FSR at $\lambda_0=1.550$ μm.

Target cavity length L' corresponds to a target resonance frequency $$v_{q'} = q'\frac{c}{2L'} + f_0,$$

hereinafter Equation 2. Integer q' denotes a target mode number and $$FSR_0 = \frac{c}{2L'}$$

is a target free-spectral range. Target resonance frequency $v_{q'}$ may correspond to an atomic or molecular transition (e.g., of krypton, argon, rubidium, strontium, or calcium), or to a frequency of the ITU grid. Per equations (1) and (2), when target cavity length L' exceeds cavity length L, target resonance frequency $v_{q'}$ is smaller than resonance frequency $v_{q'}$.

Setting target mode number q' equal to first mode number q and combining Equations 1 and 2 shows that length difference $$\Delta = (L - L') = \frac{(v_{q'} - v_q)}{v_{q'}} L,$$

hereinafter Equation 3. Without departing from the scope hereof, target mode number q' may be unequal to first mode number q.

In an embodiment, surface 122 has sufficient curvature that a resonant mode of optical cavity 100 is bound in its transverse width, and is smaller than the diameter of either mirror 110 and 120, by a factor of ten, for example. In such a resonant mode, the transverse power distribution of the light can be described by a Hermite-Gaussian function. In an example of optical cavity where surface 112 of mirror 110 is concave, the optical axis of the resonant mode is formed by a line between the centers of curvatures of mirrors 110 and 120, and at least one of optical cavity 100 and optical cavity 300 has a finesse between fifty and one million. The frequency of the resonant modes (e.g., $v_q$ $v_{q'}$) of such an optical cavity 100 (or optical cavity 300), when medium 150 is at a vacuum pressure, is determined by the cavity length 100L only (or equivalently cavity length 300L) such that no angle tuning is possible. Therefore, there is no lower bound in the useful accuracy of cavity-length control, e.g., via methods disclosed herein.

Figure 5:
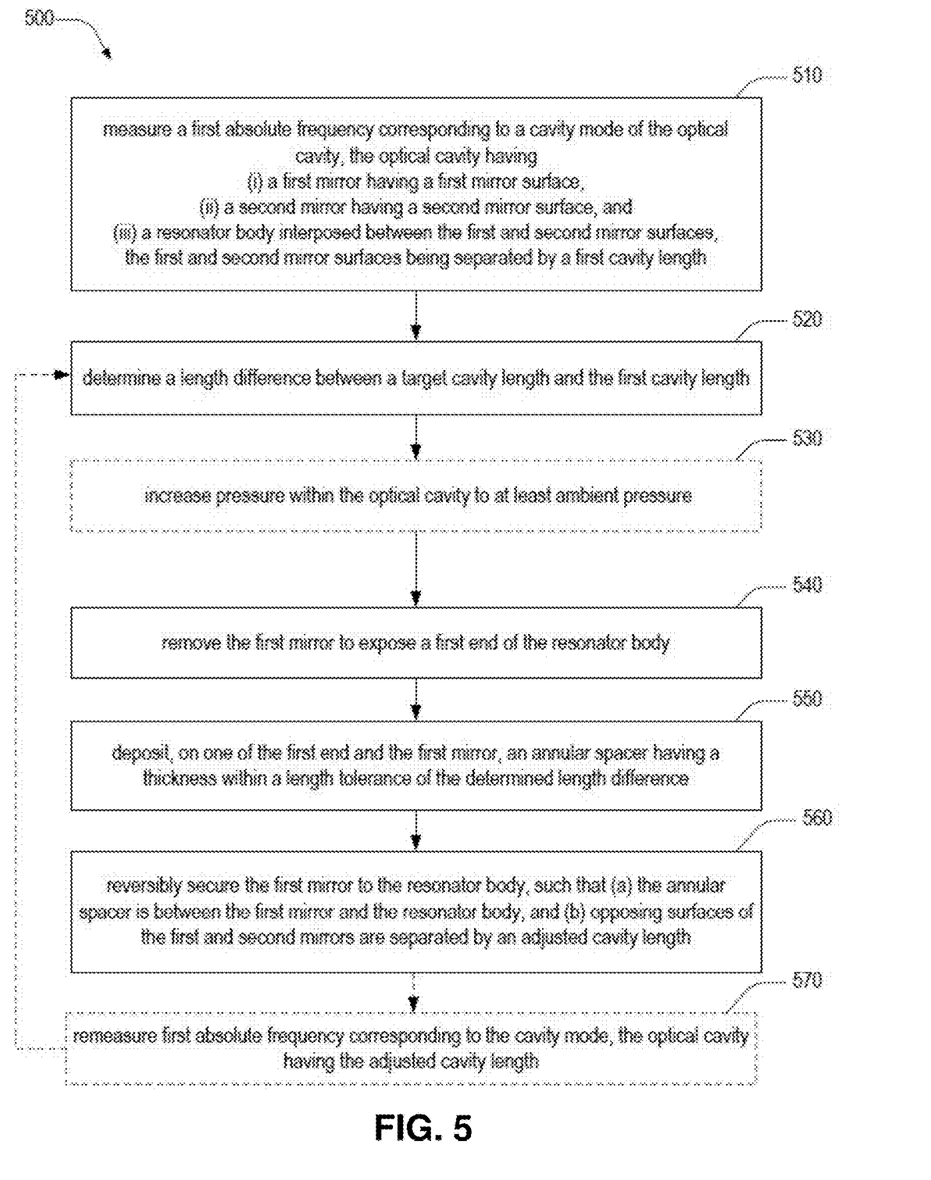
FIG. 5 is a flowchart illustrating a method for adjusting cavity length of an optical cavity, in an embodiment.

FIG. 5 is a flowchart illustrating a method 500 for adjusting the cavity length of an optical cavity. Method 500 includes at least one of steps 510, 520, 530, 540, 5540, 560, and 570. FIGS. 1-5 are best viewed together in the following description.

Step 510 includes measuring a first absolute frequency corresponding to a cavity mode of the optical cavity. The optical cavity has (i) a first mirror having a first mirror surface, (ii) a second mirror 120 having a second mirror surface, and (iii) a resonator body interposed between the first and second mirror surfaces. The first and second mirror surfaces are separated by a first cavity length. In an example of step 510, resonance frequency $$v_q = q\frac{c}{2L}$$

of optical cavity 100 is measured. Resonance frequency $v_q$ may be measured while optical cavity 100 is under vacuum. First absolute frequency is, for example, measured with an accuracy of ±100 Hz.

Step 510 and any subsequent measurement of cavity mode frequencies may include use of a frequency comb having a known carrier envelope offset frequency $f_{ceo}$ and repetition rate frequency $f_{rep}$, referenced to a stable, atomically referenced, radiofrequency. Such a source may be the signal from a Rubidium-controlled oscillator, a cesium clock, or a hydrogen maser. The signal may have a 10-MHz frequency. The frequency $f_n$ of the comb tooth nearest the optical frequency of the cavity mode of interest (having a target cavity mode frequency) is known from $f_n=f_{ceo}+nf_{rep}$, where mode order n is an integer. A wavemeter may be used to determine the order n of the comb tooth. In an example of step 510, a continuous-wave laser is locked to the cavity mode of interest, and a heterodyne beat is formed between that laser the nearest comb tooth. This beat note gives the difference frequency between the continuous wave laser and the nearest comb tooth. This frequency may be measured on a radiofrequency spectrum analyzer, or a frequency counter. To obtain the absolute frequency of the cavity mode, the difference frequency is added to the comb-tooth frequency. Depending on the averaging time of the measurement, the accuracy and stability of the radiofrequency reference, and the fidelity of the lock of the continuous wave laser, the accuracy of the measurement may be at the Hz level, e.g., between one Hz and one hundred Hz.

For a low-tolerance determination of the absolute frequency of the cavity mode, a laser may be locked to the cavity mode, and the frequency of that laser is measured on a wavemeter to achieve a resolution exceeding 10 MHz, for example. That is, the wavemeter is capable of detecting frequency differences of less than 10 MHz. For example, some commercial wavemeters are capable of detecting frequency differences of two megahertz.

Step 520 includes determining a length difference between a target cavity length and the first cavity length. The target cavity length corresponds to a plurality of resonance frequencies that includes a target absolute optical frequency. The length difference is a function of the first absolute frequency, the target absolute frequency, the first cavity length, and a predetermined free-space wavelength. In an example of step 520, length difference Δ is determined by Equation 3. The predetermined free-space wavelength may correspond to target resonance frequency $$v_{q'} = q'\frac{c}{2L'}.$$

Step 530, when included, is performed before step 540. Step 530 includes increasing pressure within the optical cavity to at least ambient pressure. In an example of step 530, the pressure of medium 150 in cavity 100 is increased to ambient pressure.

Step 540 includes removing the first mirror to expose a first end of the resonator body. In an example of step 540, mirror 110 of optical cavity 100 is removed from resonator body 130. In a second example of step 540, surface 112 of mirror 110 was concave and Applicant measured the first cavity length multiple times after several iterations of de-contacting and re-contacting surface 112 to and from surface 132 of resonator body 130. The scatter on these measurements was approximately ±87.5 nm. In this second example, the first absolute frequency was 800 MHz, the optical cavity had an FSR of 3 GHz, and the predetermined free-space wavelength was 1319 nm.

Step 550 includes depositing, on one of the first end and the first mirror, an annular spacer having a thickness within a length tolerance of the determined length difference. In an example of step 550, annular spacer 310 is deposited on surface 112 of mirror 110, FIG. 3.

Step 560 includes securing the first mirror to the resonator body, such that (a) the annular spacer is between the first mirror and the resonator body, and (b) opposing surfaces of the first and second mirrors are separated by an adjusted cavity length. The adjusted cavity length is within the length tolerance of the target cavity length. The step of securing may include at least one of (a) reversibly securing the first mirror to the resonator body and (b) securing the first mirror to the resonator body via a direct bonding process such as optical contact bonding and/or direct bonding, such as chemically activated direct bonding. In an example of step 560, mirror 110 is secured to resonator body 130 such that annular spacer 310 is between first mirror 110 and resonator body 130 and surfaces 112 and 122 are separated by adjusted cavity length 300L.

As used herein, reversibly securing includes methods wherein the first mirror may be coupled to the resonator body in a manner allowing the first mirror to be later separated from the resonator body. For example, methods include iterative processes involving coupling and removing the first mirror and the resonator body a plurality of times. Reversibly securing a first surface of a first object to a second surface of a second object may allow the first surface to be separated from the second surface with minimal material loss from at least the first surface or minimal material gain to at least the first surface. For example, the first surface is surface 132 of resonator body 130 and the second surface is surface 312 of annular spacer 310. Reversibly securing surfaces 132 and 312 may allow for separation of surfaces 132 and 312 changes cavity length 100L by no more than its surface figure and/or its root-mean-square surface roughness. In an embodiment, reversibly securing the first mirror to the resonator body allows for the first mirror to be separated from the resonator body in manner that does not substantially change the cavity length of the resonator body, such as changing the cavity length by less than length tolerance δ, or for example, changing the cavity length by less than 10 nm, or optionally for some embodiments less than 5 nm or optionally for some embodiments less than 1 nm.

Step 570 includes re-measuring first absolute frequency corresponding to the cavity mode, in which the optical cavity has the adjusted cavity length. In an example of step 570, resonance frequency $$f_q = q\frac{c}{2L_{300}}$$

of optical cavity 300 is measured. Resonance frequency $f_q$ may be measured while optical cavity 300 is under vacuum.

After step 570, method 500 may also include repeating steps 520-570 where, in step 520, the adjusted cavity length of step 560 replaces the first cavity length. Method 500 may include repeating steps 520-570 until the length difference of step 520 decreases to be less than a predetermined length-difference tolerance. Iterative repetition of steps 520-570 may or may not include step 530. The length difference being less than the predetermined length-difference tolerance corresponds to both (i) $f_q$ and $v_{q'}$ differing by a frequency error Δv less than a predetermined frequency-difference tolerance and (ii) $FSR_{300}$ and $FSR_0$ differing by less than a predetermined difference in free-spectral range. Free-spectral range may be measured via a sideband modulation technique.

In a first example of implementing method 500, Applicant achieved a frequency error Δv=+85 MHz for an embodiment of optical cavity 300 having an FSR of 6 GHz, where the predetermined free-space wavelength was 1319 nm. This frequency error corresponds to a growth error of +9.3 nm from a length difference of Δ=55 nm determined in step 520.

In a second example of implementing method 500, Applicant achieved a frequency error Δv=−40 MHz for an embodiment of optical cavity 300 having an FSR of 3 GHz, where the predetermined free-space wavelength was 1556 nm. This frequency error corresponds to a growth error of −10.4 nm from a length difference of 430.5 nm determined in step 520.

STATEMENTS REGARDING INCORPORATION
BY REFERENCE AND VARIATIONS

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individual or in any combination. Additionally, unless otherwise specified, all isotopic variants of compounds disclosed herein are intended to be encompassed by the disclosure. For example, it will be understood that any one or more hydrogens in a molecule disclosed can be replaced with deuterium or tritium. Isotopic variants of a molecule are generally useful as standards in assays for the molecule and in chemical and biological research related to the molecule or its use. Methods for making such isotopic variants are known in the art. Specific names of compounds are intended to be exemplary, as it is known that one of ordinary skill in the art can name the same compounds differently.

Every formulation or combination of components described or exemplified herein can be used to practice the invention, unless otherwise stated.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method for adjusting a cavity length of an optical cavity, comprising:
   measuring a first absolute frequency corresponding to a cavity mode of the optical cavity, the optical cavity having (i) a first mirror having a first mirror surface, (ii) a second mirror having a second mirror surface, and (iii) a resonator body interposed between the first and second mirror surfaces, the first and second mirror surfaces being separated by a first cavity length;
   determining a length difference between a target cavity length and the first cavity length, the target cavity length corresponding to a plurality of resonance frequencies that includes a target absolute optical frequency, the length difference being a function of the first absolute frequency, the target absolute optical frequency, the first cavity length, and a predetermined free-space wavelength;
   removing the first mirror to expose a first end of the resonator body;
   depositing, on one of the first end and the first mirror, a spacer having a thickness within a length tolerance of the determined length difference; and
   reversibly securing the first mirror to the resonator body, such that (a) the spacer is between the first mirror and the resonator body, and (b) opposing surfaces of the first and second mirrors are separated by an adjusted cavity length that is within the length tolerance of the target cavity length.

2. The method of claim 1, the predetermined free-space wavelength corresponding to the target absolute optical frequency.

3. The method of claim 2, the target mode having a target mode number q', the first absolute frequency corresponding to a first mode number q of the optical cavity and being denoted by $$v_q = q\frac{c}{2L} + f_0$$

where c is the speed of light in vacuum, $f_0$ is an offset frequency, and L is the first cavity length, the target mode number q' being equal to first mode number q.

4. The method of claim 2, target mode number q' corresponding to a mode frequency $$v_{q'} = q'\frac{c}{2L'} + f_0,$$

where L' denotes the target cavity length, the determined length difference being $$(L - L') = \frac{(v_{q'} - v_q)}{v_{q'}}L.$$

5. The method of claim 2, the target mode having a target mode number q', the first absolute frequency corresponding to a first mode number q of the optical cavity and being denoted by $$v_q = q\frac{c}{2L} + f_0$$

where c is the speed of light in vacuum, $f_0$ is an offset frequency, and L is the first cavity length, the target mode number q' and first mode number q being unequal.

6. The method of claim 1, during the step of measuring, the optical cavity having a pressure less than ten millitorr, and further comprising, before removing the first mirror, increasing the pressure to at least ambient pressure.

7. The method of claim 1, the step of measuring the first cavity length comprising obtaining an interferometric measurement thereof.

8. The method of claim 1, the length tolerance being at most ten nanometers.

9. The method of claim 1, the length tolerance corresponding to a difference $\Delta v(\lambda)$, between the target absolute optical frequency and the first optical frequency, that is less than one percent of a free-spectral range of the optical cavity when the free-space wavelength $\lambda$ equals $\Delta_0=1.550$ μm and $\Delta v(\lambda) \propto |\lambda - \lambda_0|^{-1}$.

10. The method of claim 1, the spacer having a thickness variation less than twenty percent of the thickness.

11. The method of claim 1, the step of depositing comprising ion-beam sputtering the spacer on one of the first end or the first mirror.

12. The method of claim 1, the step of securing comprising reversibly securing via chemically activated direct bonding.

13. The method of claim 1, the resonator body having, at temperatures between 5° C. and 55° C., a thermal coefficient of expansion less than fifty parts-per-billion per degree centigrade.

14. The method of claim 1, the spacer being formed of fused silica.

15. The method of claim 1, the target absolute optical frequency corresponding to an atomic or molecular transition.

16. The method of claim 15, the target absolute optical frequency corresponding to an atomic transition of one of rubidium, strontium, calcium, krypton, and argon.

17. The method of claim 1, the target absolute optical frequency corresponding to a frequency of the ITU grid.

18. The method of claim 1, the step of reversibly securing further comprising directly bonding the first mirror to the resonator body.

19. The method of claim 18, the step of directly bonding comprising bonding the first mirror to the resonator body via an optical contact bond.

20. The method of claim 1, the spacer having an annular shape.

21. A method for adjusting a cavity length of an optical cavity, comprising:
measuring a first absolute frequency corresponding to a cavity mode of the optical cavity, the optical cavity having (i) a first mirror having a first mirror surface, (ii) a second mirror having a second mirror surface, and (iii) a resonator body interposed between the first and second mirror surfaces, the first and second mirror surfaces being separated by a first cavity length;
determining a length difference between a target cavity length and the first cavity length, the target cavity length corresponding to a plurality of resonance frequencies that includes a target absolute optical frequency, the length difference being a function of the first absolute frequency, the target absolute optical frequency, the first cavity length, and a predetermined free-space wavelength;
removing the first mirror to expose a first end of the resonator body;
depositing, on the first mirror, a spacer having a thickness within a length tolerance of the determined length difference; and
reversibly securing the first mirror to the resonator body, such that (a) the spacer is between the first mirror and the resonator body, and (b) opposing surfaces of the first and second mirrors are separated by an adjusted cavity length that is within the length tolerance of the target cavity length.

22. A method for adjusting a cavity length of an optical cavity, comprising:
measuring, to within an accuracy of 100 Hz, a first absolute frequency corresponding to a cavity mode of the optical cavity, the optical cavity having (i) a first mirror having a first mirror surface, (ii) a second mirror having a second mirror surface, and (iii) a resonator body interposed between the first and second mirror surfaces, the first and second mirror surfaces being separated by a first cavity length;
determining a length difference between a target cavity length and the first cavity length, the target cavity length corresponding to a plurality of resonance frequencies that includes a target absolute optical frequency, the length difference being a function of the first absolute frequency, the target absolute optical frequency, the first cavity length, and a predetermined free-space wavelength;
removing the first mirror to expose a first end of the resonator body;

depositing, on one of the first end and the first mirror, a spacer having a thickness within a length tolerance of the determined length difference; and reversibly securing the first mirror to the resonator body, such that (a) the spacer is between the first mirror and the resonator body, and (b) opposing surfaces of the first and second mirrors are separated by an adjusted cavity length that is within the length tolerance of the target cavity length.

* * * * *